US012633765B2

(12) United States Patent
Herzog

(10) Patent No.: US 12,633,765 B2
(45) Date of Patent: May 19, 2026

(54) METHOD FOR ANALYZING THE CONTACT ASSIGNMENT OF A CONTACT ELEMENT OF A CELL MODULE FOR A VEHICLE BATTERY AND MODULE CHARGER HAVING A DIAGNOSIS FUNCTION FOR THE CONTACT ASSIGNMENT OF A CONTACT ELEMENT

(71) Applicant: TKR Spezialwerkzeuge GmbH, Gevelsberg (DE)

(72) Inventor: Martin Herzog, Hagen (DE)

(73) Assignee: TKR Spezialwerkzeuge GmbH, Gevelsberg (DE)

( * ) Notice: Subject to any disclaimer, the term of this patent is extended or adjusted under 35 U.S.C. 154(b) by 827 days.

(21) Appl. No.: 17/979,865

(22) Filed: Nov. 3, 2022

(65) Prior Publication Data

US 2023/0138164 A1     May 4, 2023

(30) Foreign Application Priority Data

Nov. 4, 2021     (DE) ...................... 10 2021 128 766.9

(51) Int. Cl.
*H02J 7/80*          (2026.01)
*H01M 10/42*        (2006.01)
(Continued)

(52) U.S. Cl.
CPC ........... *H02J 7/80* (2026.01); *H01M 10/4285* (2013.01); *H01M 10/441* (2013.01);
(Continued)

(58) Field of Classification Search
USPC ......................................................... 320/134
See application file for complete search history.

(56) References Cited

U.S. PATENT DOCUMENTS

2014/0021917 A1*  1/2014  Paupert ................. B60L 53/305
                                                320/109
2015/0295430 A1*  10/2015  Wright ............... H02J 7/00047
                                                307/43
(Continued)

FOREIGN PATENT DOCUMENTS

CN          104603627 A  *  5/2015  ........... G01R 31/396
CN          108068652 A  *  5/2018  ............ B60W 50/14
(Continued)

*Primary Examiner* — Mohammed Alam
(74) *Attorney, Agent, or Firm* — ICE MILLER LLP; Justin D. Swindells

(57)          ABSTRACT
A method for analyzing the contact assignment of a contact element of a cell module for a vehicle battery to charge or discharge individual cells. A module charger charges/discharges the cell module and includes a diagnosis function for the contact assignment of the contact element. A method is disclosed for operating a module charger, which allows for charging and discharging cells of different cell modules with different contact assignments and automatically prevents incorrect operation. The method includes connecting a contact element of a diagnosis unit corresponding to the contact element to establish an electrical connection with each contact. A voltage measurement is taken of a contact against all other individual contacts, and the voltage values assigned to the contacts are saved. Then, based on the assigned voltage values, the contact assignment with respect to the individual cells is determined and, finally, the cell module is charged or discharged.

10 Claims, 1 Drawing Sheet

Figure 1:
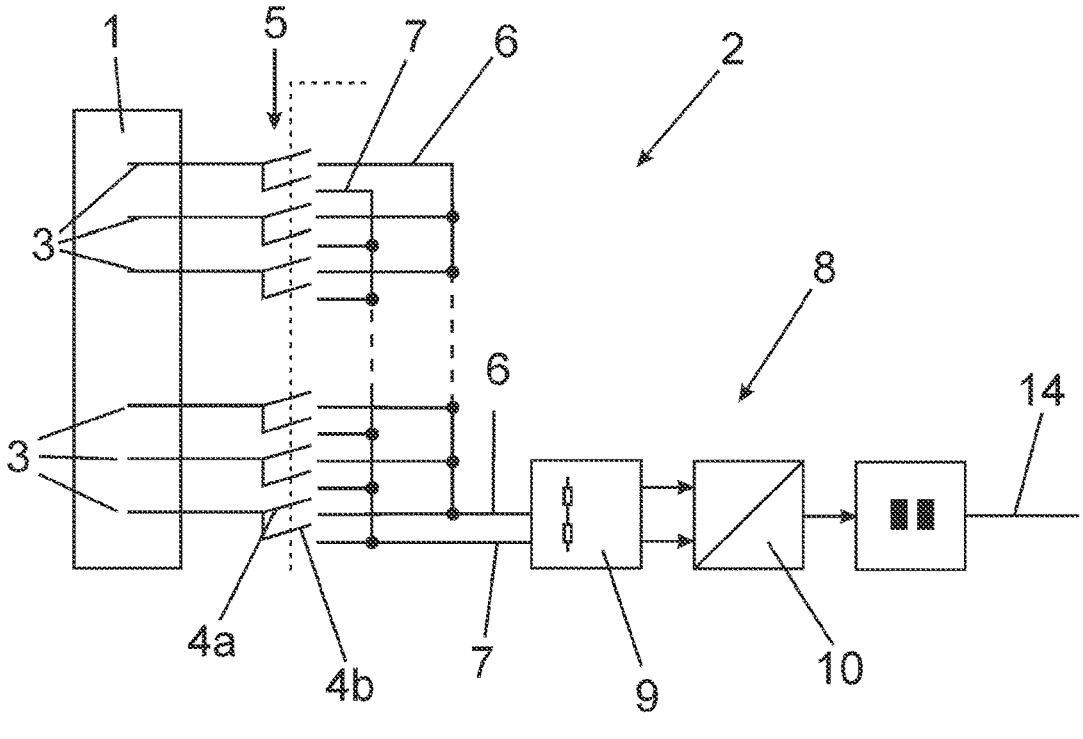

(51) Int. Cl.
| | | |
|---|---|---|
| *H01M 10/44* | (2006.01) | |
| *H01M 10/46* | (2006.01) | |
| *H01M 10/48* | (2006.01) | |
| *H02J 7/00* | (2026.01) | |

(52) U.S. Cl.
CPC ......... *H01M 10/46* (2013.01); *H01M 10/482* (2013.01); *H02J 7/865* (2026.01); *H01M 2220/20* (2013.01)

(56) References Cited

U.S. PATENT DOCUMENTS

| | | |
|---|---|---|
| 2015/0318727 A1 | 11/2015 | Vogel |
| 2021/0122256 A1* | 4/2021 | Jernej ..................... B60L 53/35 |
| 2021/0203016 A1 | 7/2021 | Bertness |

FOREIGN PATENT DOCUMENTS

| | | |
|---|---|---|
| DE | 10 2016 211 383 A1 | 12/2017 |
| DE | 10 2020 216 599 A1 | 7/2021 |
| FR | 2943473 A1 | 9/2010 |

* cited by examiner

METHOD FOR ANALYZING THE CONTACT ASSIGNMENT OF A CONTACT ELEMENT OF A CELL MODULE FOR A VEHICLE BATTERY AND MODULE CHARGER HAVING A DIAGNOSIS FUNCTION FOR THE CONTACT ASSIGNMENT OF A CONTACT ELEMENT

This application claims the benefit of Germany Patent Application No. 10 2021 128 766.9, filed Nov. 4, 2021, which is incorporated herein by reference in its entirety.

The invention relates to a method for analyzing the contact assignment of a contact element of a cell module for a vehicle battery for subsequently charging or discharging of individual cells of the cell module by means of a module charger, and to a module charger for charging and/or discharging a cell module of a vehicle battery and having a diagnosis function for the contact assignment of a contact element of the cell module.

The batteries of electrically driven vehicles are typically formed of individual battery cells which are connected in series and grouped together in cell modules, wherein a vehicle battery is typically formed of numerous cell modules. In the event of a fault with individual cells, the affected cell module can therefore be easily removed, replaced or repaired and subsequently electrically connected to the vehicle battery again.

However, before the battery can be used again after cells have been replaced, it must be ensured that all cells of the cell module and all cell modules have the same voltage or rather the same state of charge. Accordingly, the cell voltage of the individual cells must be measured and individual cells, in particular the newly installed cells, must be charged or, alternatively, discharged, which can be done by means of a module charger.

The electrical connection of such a module charger as well as the electrical connection of the cell modules in the vehicle battery is typically made by means of a standardized connector of a cell contacting system. However, the assignment of the individual contacts of the connector not only varies from manufacturer to manufacturer, but often even from vehicle type to vehicle type of the same manufacturer and sometimes even for different versions of a vehicle type, so that at least one specific adapter cable and, if necessary, even a specific module charger is required for each vehicle type is necessary.

In workshops, in particular, which repair vehicles of numerous manufacturers, numerous module chargers would therefore have to be provided in order to be able to repair the different vehicles. In addition, there is the risk that an incorrect connection cable is used, which can result at the least in a deterioration of the balance of the charge and, in the worst-case scenario, to total discharge of individual cells and thus to renewed damage to the vehicle battery.

The object of the invention is therefore to provide a module charger for cell modules of a vehicle battery as well as a method for operating a module charger of this kind, which allows for general use for charging and discharging cells of numerous different cell modules with different contact assignments of the contact element of the cell module and which automatically prevents incorrect operation and, at the same time, significantly reduces the investment costs of a workshop in module chargers.

The object is solved according to the invention by a method for analyzing the contact assignment of a contact element of a cell module according to claim 1 and by a module charger for charging and/or discharging a cell module of a vehicle battery having a diagnosis function according to claim 9. Advantageous developments of the invention are described in the dependent claims.

The method according to the invention for analyzing the contact assignment of a contact element of a cell module for a vehicle battery for charging or discharging of individual cells of the cell module by means of a module charger comprises, as method steps, firstly connecting a contact element of a diagnosis unit corresponding to the contact element of the cell module in order to establish an electrical connection with each of the contacts of the cell module, wherein, subsequently, at least one voltage measurement of a contact against all other individual contacts of the contact element of the cell module is carried out and the voltage values assigned to the contacts are stored. Then, on the basis of the voltage values assigned to the contacts, the contact assignment of the contact element with respect to the connection to the individual cells of the cell module is determined and, finally, the cell module is then charged or discharged.

The module charger according to the invention for charging and/or discharging a cell module of a vehicle battery and having a diagnosis function for the contact assignment of a contact element of the cell module comprises a contact element corresponding to the contact element of the cell module for establishing an electrical connection to each of the contacts of the cell module, wherein each contact is connected to two diagnosis lines of the module charger via a switch of an electronic switching unit in each case, such that each contact can be connected at least to the first or to the second diagnosis line via the two switches. Furthermore, the module charger comprises a voltage measuring unit for measuring the voltage difference between the individual contacts each connected to one of the diagnosis lines and thus between the individual cells of the cell module, a diagnosis unit for determining the contact assignment of the contact element with respect to the connection to the individual cells of the cell module, and a charging and/or discharging unit of the cell module.

The inventors have recognized that it is advantageous to check the assignment of the contacts of a contact element of a cell module prior to a charging and/or discharging procedure in order to thus prevent incorrect charging of or damage to the vehicle battery. In addition, a module charger having a diagnosis unit advantageously enables the charging and/or discharging of numerous different cell modules, such that only one single module charger is required for various vehicles or vehicle types at a location for repairing vehicle batteries.

In principle, the module charger is designed to be able to charge and/or discharge the individual cells, in particular all cells, of a cell module of a vehicle battery. Furthermore, according to the invention, the module charger can also measure the voltage between two contacts and thus the cell voltage or rather the difference between the voltages of two contacts. Furthermore, in principle, it is also possible, by means of the module charger, to charge or discharge individual cells, in particular cells with differing voltage values, in a targeted manner via the respective determined contacts by means of the module charger in order to equalize the voltage level of all cells of the cell module with one another. Preferably, the module charger also has further functions, in particular for analyzing and/or diagnosing a cell module, for example a resistance measurement of resistors arranged in the cell module or the reading out of sensors in or on the cell module. Furthermore, the module charger preferably comprises at least one interface for data exchange with a further controller and/or computing unit, wherein data transmission can take place both by cable and by radio or rather wirelessly.

In principle, the cell module comprises multiple individual cells, wherein the number of individual cells of a cell module can, in principle, be selected as desired. Preferably, however, the cell module comprises at least 16, particularly preferably at least 40, very particularly preferably at least 50, and especially preferably exactly 56 individual cells. The total voltage of the cell module results from the number of cells, the individual cell voltage, and the interconnection of said cells in the cell module, and therefore the number of cells is not freely selectable but rather depends on the desired total voltage. However, in principle, the total voltage is freely selectable, but a voltage of 400 V or 800 V is preferred. The individual cells in the cell module may, in principle, be connected to one another in any desired manner, wherein an arrangement of multiple, in particular all, cells of a cell module in series is preferred, in particular in order to be able to provide the required voltage.

In principle, it is also possible for the vehicle battery to only comprise one cell module, but a significantly higher storage capacity is usually required, and therefore numerous cell modules are installed in the vehicle battery and, in particular, are interconnected in series. However, in order to be able to construct and/or repair a vehicle battery in an improved manner, at least the individual cell modules in the vehicle battery are replaceable in order to be able to continue using the remaining fault-free cell modules in the event of a fault with one cell module or rather individual cells of a cell module.

In the cell module, each individual cell and/or the connection between two cells arranged in series is preferably guided to the outside so as to be contactable, such that the relevant cell voltage can be measured from outside the cell module and, particularly preferably, at a contact of a corresponding contact element, in particular a connector.

In principle, the contact element is a component having multiple contacts to one electrical conductor in each case and preferably to each of the cells of the cell module and/or to other components of the cell module, in particular to coding resistors, temperature-dependent resistors, temperature sensors, further sensors, and/or other electrical components. The contact element of the cell module is preferably a connector and, particularly preferably, a standardized connector. Furthermore, the connector is preferably part of a cell-contacting system and, in particular, a 108-pin connector of a cell-contacting system. Further preferably, the main power terminals of the cell module are preferably formed separately from the contact element of the cell module for contacting the individual cells.

The method for analyzing the contact assignment is preferably carried out after each time a cell is replaced in the cell module and/or after each time a cell module is replaced in a vehicle battery. Particularly preferably, the method for analyzing the contact assignment is carried out prior to each charging and/or discharging process of a cell module or vehicle battery by means of a module charger and discharger.

According to the invention, at least voltage measurements take place between a first contact and all further contacts of the contact element of the cell module. Two contacts are measured against one another in that one contact is connected to the first diagnosis line, in particular by means of one switch of the electronic switching unit, and then the other contact is connected to the second diagnosis line, in particular by means of the other switch of the switching unit associated with the contact, such that a voltage difference between the two diagnosis lines can be measured. Likewise, according to the invention, one switch of the relevant electronic switching unit connects the relevant contact to the first diagnosis line and the second switch connects the relevant contact to the second diagnosis line.

Each contact is switched by the electronic switching unit preferably via a central control unit of the module charger or a diagnosis module of the module charger. However, in principle, it is also conceivable for the electronic switching units to be actuated via an external control unit or to connect an internal control unit to an external control unit.

In principle, the two diagnosis lines are connected to the diagnosis unit and/or a voltage measurement preferably takes place, in principle, between the two diagnosis lines. Furthermore, all contacts are connected to the first diagnosis line via a switch of the electronic switching unit and to the second diagnosis line via a second switch of the electronic switching unit. Furthermore, the diagnosis lines and/or the output of the voltage measuring unit are preferably connected to an analog-digital converter and, particularly preferably, to a 24-bit analog-digital converter. Likewise preferably, the analog-digital converter is connected to a controller in a galvanically isolated manner for data exchange, wherein the communication preferably takes place via SPI. Furthermore, the analog-digital converter and/or the voltage measuring unit is preferably connected to the diagnosis lines via a voltage divider. The diagnosis unit preferably comprises a constant current source for switching a constant current to a contact pair for measuring a resistance.

In principle, the voltage measuring unit may be designed in any desired manner and is preferably intended for measuring voltage differences of up to ±300 V, particularly preferably up to ±400 V, very particularly preferably up to ±800 V, and especially preferably up to ±1 kV.

A preferred embodiment of the method according to the invention for analyzing the contact assignment provides that, when carrying out the voltage measurement, for each individual contact is measured against every other contact of the contact element of the cell module and the relevant voltage difference between the two contacts measured in each case is stored for determining the contact assignment, as a result of which an analysis of the contacting of the contact element that is as comprehensive as possible is carried out in a particularly simple manner. During the voltage measurement, it is in particular determined whether the relevant contact has a voltage or rather voltage difference with respect to the other contacts. If this is the case, the contact is connected to a cell of the cell module. Contacts without a voltage difference are either not assigned or have another function that can be determined within the scope of another measurement and in another manner.

Here it makes sense to measure all contacts against one another, since a measurement against only one contact does not produce a reliable result, since the contacts of the contact element may be randomly assigned. For example, the first selected contact element against which all other contacts are measured may not be assigned, and therefore a meaningful voltage measurement is not possible. Furthermore, a measurement of a contact for the total voltage of the cell module against the contact of the last cell of a series arrangement of cells in a cell module, for example, also results in a difference value of zero, and therefore no distinction can be made as to whether the contact for the total voltage or an unassigned contact has been found. However, if the relevant contact is then measured against one or more other contacts, this distinction can be made. In addition, the contact or rather the contacts for the total voltage of the cell module can be found in this way, since here is where the largest voltage is applied.

According to an advantageous development of the method according to the invention for analyzing the contact assignment, during the voltage measurement, firstly all other contacts are measured against a first individual contact in a relevant first measurement and, subsequently, only the contacts for which no voltage was measurable or rather a voltage of zero was measured in the first measurement are measured against a second individual contact in another measurement. Particularly preferably, this is continued, i.e. for as long as an additional measurement produces a voltage difference of zero for the relevant contact, said contact is measured against other contacts until a voltage value or rather voltage difference that is not equal to zero has been found or the relevant contact has been measured against all remaining contacts and, therefore, the contact—in the absence of a voltage difference—has been confirmed as unassigned.

In a preferred embodiment of the method according to the invention for analyzing the contact assignment, the voltage values assigned to the contacts for determining the contact assignment of the contact element are sorted according to their order of the absolute voltage values or rather voltage difference value and/or according to the order of the smallest relative differential voltage that is not equal to zero, in order to thus identify the contacts in the sequence in which they are connected to the individual cells of the cell module arranged in series. Additionally or alternatively, it is also conceivable to sort in each case according to the increment or rather difference of the known individual cell voltage. Since a measurement takes place in each case against an individual contact, the polarity and/or the magnitude of the voltage difference is preferably also taken into account during the sorting and/or when determining the contact assignment.

A significant improvement of the method according to the invention for analyzing the contact assignment can also be achieved in that, after the voltage measurement, a resistance measurement is also carried out for at least some of the contacts and preferably for each individual contact against every other contact, for which purpose a constant current is switched to each pair of contacts to be measured one against the other and, subsequently, the resistance between both contacts is measured. The resistance is preferably measured by means of the diagnosis unit. The constant current can be switched via the diagnosis lines and/or by means of the electronic switching unit. Preferably, as with the voltage measurement, the first contact is connected to the first diagnosis line by means of the first switch of the associated electronic switching unit and the second contact is connected to the second diagnosis line via the second switch of the associated electronic switching unit.

Although the resistances can be measured for any number of reasons, a measurement of this kind is especially useful for finding the contacts or, alternatively, contact pairs of temperature-dependent resistors, in particular thermistors or, alternatively, NTC resistors, for determining the cell temperature. A cell module may comprise any number of temperature-dependent resistors of this kind, but 1 to 6 of said resistors are typically arranged in a cell module. The individual resistors of a cell module and, in particular, the temperature-dependent resistors may each be connected to two individual contacts or share one contact in pairs, in groups, or as a whole and comprise an associated second contact. In addition, the cell modules are typically identified by means of at least one coding resistor, which marks information on the cell module, for example the generation and/or the type of the battery or, alternatively, the cell module.

However, in order to significantly speed up the resistance measurement of the contact element, a further development of the method according to the invention for analyzing the contact assignment provides for only carrying out a resistance measurement for contacts for which no voltage or rather a voltage of zero was measured during the previous voltage measurement, as a result of which the cells are not measured and/or a search is performed specifically for resistors and/or sensors that are connected to the respective contacts.

Although it would be sufficient, in principle, to only measure the voltage and/or the resistance in order to analyze the contact assignment immediately after the module charger is connected, it is also preferable to measure the voltage and/or resistance during the charging and/or discharging, wherein it is particularly preferable to only measure the voltage and/or resistance of the contacts that are relevant to the cell being charged or discharged. The measurement during charging and/or discharging may take place periodically or continuously. In addition, the measurement may take place as needed, for example in the form of a voltage measurement in the event that a temperature deviation or an instance of a threshold temperature being exceeded is detected during a periodically performed resistance measurement.

In order to achieve a better efficiency in a partial load range depending on the required charging or, alternatively, discharging power, such that the active power supplies and/or discharging units can always be operated in a particularly advantageous power range, a preferred embodiment of the method according to the invention provides for multiple power supplies and/or discharging units, in particular arranged parallel to one another, to be switched on or off as required during the charging and/or discharging. The power supplies are preferably power supply units and, particularly preferably, switched-mode power supply units.

With regard to the module charger for charging and/or discharging a cell module, an embodiment is preferred in which the electronic switching unit in each case comprises at least one, preferably two optoelectronically galvanically isolated switches (OptoMOS) and, very particularly preferably, is formed thereof. In addition, it is preferred that the electronic switching unit is designed and/or actuated such that activation of both switches simultaneously is excluded. An opening or rather activation of both switches simultaneously can be excluded both by means of the hardware itself and, additionally or alternatively, electronically or rather by means of the control software. In particular in the case that optoelectronically galvanically isolated switches are used, this is already excluded by the switches used. A closing of both switches of the OptoMOS results in an internal short circuit, which can, however, fundamentally be used to check the function of the switch itself, the function of a constant current source, and/or the offset of the analog-digital converter.

Figure 2:
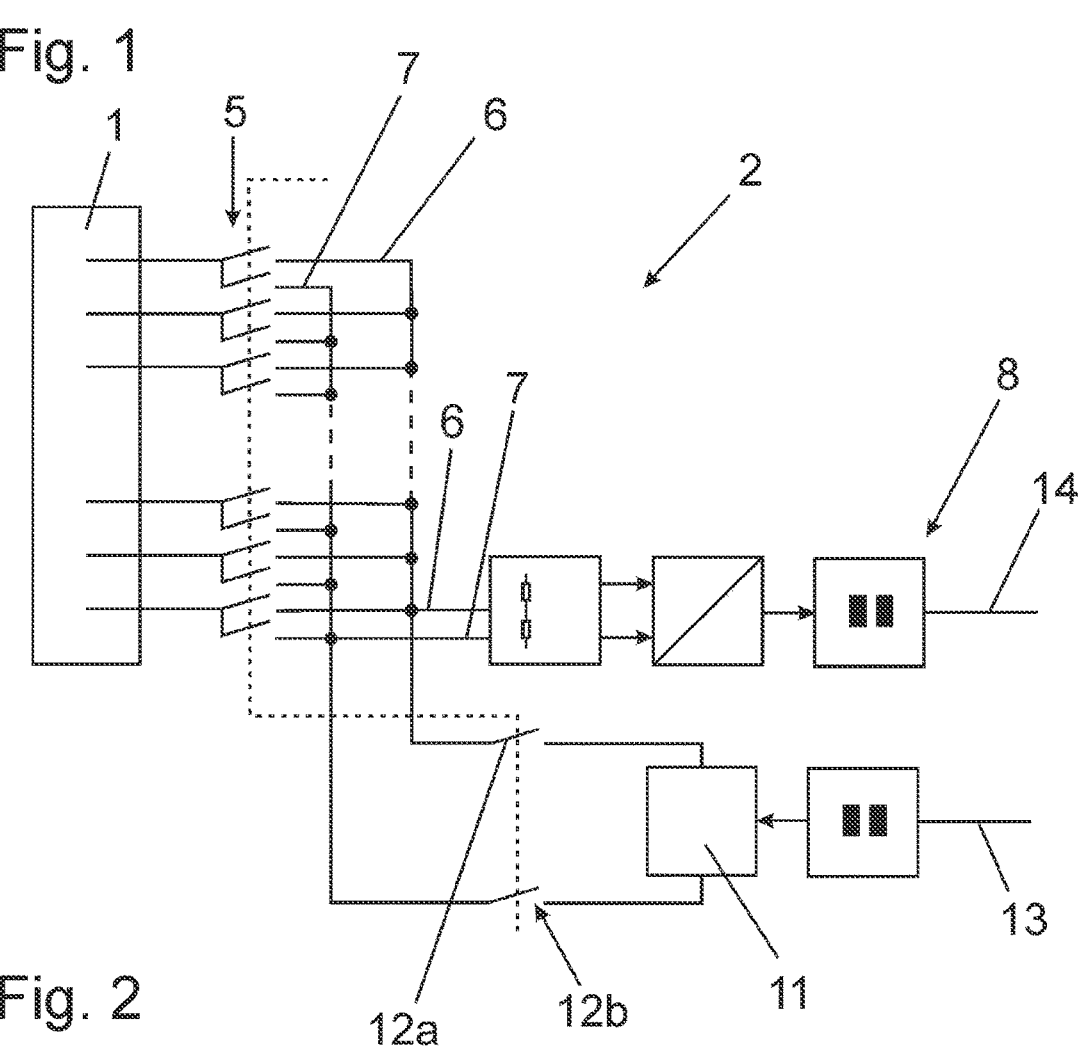

Multiple exemplary embodiments of module chargers and of the method of use are explained in greater detail below with reference to the drawings, in which:

FIG. 1 is a schematic circuit diagram of a first embodiment of a diagnosis unit of a module charger, and FIG. 2 is a schematic circuit diagram of a second embodiment of a diagnosis unit of a module charger.

In principle, the module charger is intended for charging and discharging individual cells of a cell module for a vehicle battery. For this purpose, in addition to a charging and discharging unit, the module charger comprises a diagnosis unit 2 by means of which the contact assignment of a 108-pin intermediate circuit short-circuit connector of a cell module can be analyzed.

For this purpose, the module charger comprises a contact element 1 that is designed as a socket for the intermediate circuit short-circuit connector (ZKS-connector) and that electrically connects one contact 3 with each of the contacts of the ZKS-connector. Some of the contacts 3 are therefore each connected to one cell of the cell module, while other contacts 3 are connected to other components of the cell module, for example coding resistors and 1 to 6 temperature-dependent resistors as temperature sensors.

In order to be able to measure the electrical voltage applied to the individual contacts 3 as well as the relevant resistance, the diagnosis unit 2 comprises two diagnosis lines 6, 7 which are each connected to one voltage measuring unit 8. The voltage measuring unit 8 comprises a voltage divider 9 and an A/D converter 10 as well as a connector for an SPI data line 14. In order to be able to measure the voltages between two contacts 3 in each case, each of the contacts 3 is connected to the first and the second diagnosis line 6, 7 via one switch 4a, b of an electronic switching unit 5 in each case (see FIG. 1). Optoelectronically galvanically isolated switches are used as the switching unit 5. It is hereby ensured that a relevant contact 3 can only be connected either to the first diagnosis line 6 or to the second diagnosis line 7 and not to both diagnosis lines 6, 7 at the same time. Then, for the voltage measurement, in each case two contacts 3 are interconnected and measured against one another by means of the electronic switching units 5.

A second embodiment of the module charger additionally permits to measure the resistances of the individual contacts 3, for which purpose a constant current source 11 is provided, which can be connected to the two diagnosis lines 6, 7 via current switches 12a, b. The constant current source 11 is connected to an external supply 13. Accordingly, by connecting individual contacts to the current-carrying diagnosis lines 6, 7 by means of the electronic switching unit 5, the resistance of the relevant contact 3 can be measured.

As soon as the contact assignment of the ZKS-connector is known, the cell module can then be charged or discharged.

In the method for analyzing the contact assignment of the ZKS-connector, firstly a first contact 3 is connected to the first diagnosis line 6 by means of the electronic switching unit 5. Subsequently, all other contacts 3 are then connected to the second diagnosis line 7 individually one after the other and the voltage is measured in each case and stored so as to be assigned to the relevant contact 3 or, alternatively, contact pair.

All contacts 3 for which a voltage of zero was measured during said first measurement are then measured against another contact 3, for which purpose the first contact 3 is disconnected from the first diagnosis line 6 and another contact 3 is connected to the first diagnosis line 6 by means of the electronic switching unit 5. Subsequently, all contacts 3 with a previously measured voltage value of zero are connected to the second diagnosis line 7 and measured. The results are again stored so as to be assigned to the contacts 3. If voltage values of zero are still measured, the procedure is repeated as often as desired with another contact 3 that is connected to the first diagnosis line 6 until all contacts 3 have been measured.

Finally, once all contacts 3 have been measured, the measured voltage values are analyzed and sorted in ascending order for this purpose, wherein the assignment to the contacts 3 is taken into account. In this way, the sequence of the cells in the cell module can be found via the respective associated contacts 3 and the contact assignment with regard to the individual cells in the cell module is known.

Since it is also known that the cell module also contains coding resistors as well as temperature-dependent resistors as temperature sensors, a constant current source 11 is subsequently connected to the two diagnosis lines 6, 7 and the individual contacts 3 are again measured against one another by means of the electronic switching units 5, wherein only one measurement takes place for the contacts 3 for which a voltage of zero was measured, since no cell can be connected to these contacts 3. Afterwards, all resistances are known.

Subsequently, individual cells, in particular cells with a voltage that deviates from the other cells, can then be charged or discharged in a targeted manner via the respective contacts 3, wherein the voltage is preferably periodically checked at the same time by means of the diagnosis unit 2 and the temperature in the cell module is monitored by means of the temperature-dependent resistors. In general, however, charging or discharging of the entire cell module with all cells together can also take place.

LIST OF REFERENCE SIGNS

1 Contact element
2 Diagnosis unit
3 Contact
4a, b Switch
5 Electronic switching unit
6 First diagnosis line
7 Second diagnosis line
8 Voltage measuring unit
9 Voltage divider
A/D converter
11 Constant current source
12a, b Current switch
13 Supply
14 SPI interface

The invention claimed is:

1. A method for analyzing the electrical contact assignment of a cell module contact system of a cell module for a vehicle battery in order to subsequently charge or discharge individual cells of the cell module by a module charger, comprising the following steps in the following order:

connecting a contact system to said cell module contact system, performing at least one voltage measurement of a contact against all other individual contacts of the contact system and storing the voltage values assigned to the contacts, wherein, when performing the at least one voltage measurement, each individual contact is measured against every further contact of the cell module contact system and the respective voltage difference between the two contacts measured in each case is stored for determining the electrical contact assignment, determining the electrical contact assignment of the individual contacts of the contact system with respect to the connection to the individual cells of the cell module on the basis of the voltage values assigned to the respective contacts, and finally charging or discharging the cell module.

2. The method for analyzing the contact assignment according to claim 1 wherein, when performing the voltage measurement, firstly all further contacts are measured against a first individual contact in a respective first measurement and, subsequently, only the contacts for which a voltage of zero was measured in the first measurement are measured against a second individual contact in another measurement.

3. The method for analyzing the contact assignment according to claim 1, wherein the voltage values assigned to the contacts for determining the electrical contact assignment of the contact element are sorted according to their order of the absolute voltage values or according to the order of the smallest differential voltage that is not equal to zero with respect to one another, in order to thus identify the contacts in the order in which they are connected to the individual cells of the cell module arranged in series.

4. The method for analyzing the contact assignment according to claim 1, wherein, after the voltage measurement, a resistance measurement is also carried out for at least some of the contacts against every other contact, for which purpose a constant current is switched to each pair of contacts to be measured one against the other and, subsequently, the resistance between both contacts is measured.

5. The method for analyzing the contact assignment according to claim 4, wherein a resistance measurement is only carried out for contacts for which no voltage or rather a voltage of zero was measured during the previous voltage measurement.

6. The method for analyzing the contact assignment according to claim 1, wherein during the charging and/or discharging a further measurement of the voltage and/or resistance is performed, wherein only a measurement of the voltage and/or resistance of the contacts that are relevant to the cell being charged or discharged takes place.

7. The method for analyzing the contact assignment according to claim 1, wherein during the charging and/or discharging multiple power supplies and/or discharging units are switched on or off as required during the charging and/or discharging.

8. A module charger for charging and discharging a cell module of a vehicle battery and having a diagnosis function for the electrical contact assignment of a cell module contact system of the cell module, comprising:

a contact system of the module charger corresponding to said cell module contact system for establishing an electrical connection with each of the contacts of the cell module, wherein each contact is connected to two diagnosis lines of the module charger via one switch of an electronic switching unit in each case, such that each contact can be connected to the first or to the second diagnosis line via the two switches, a voltage measuring unit for measuring the voltage difference between the individual contacts each connected to one of the diagnosis lines for subsequently saving the measured voltages of each contact, a circuit configured to carry out the diagnosis function and to determine the electrical contact assignment of the contact system with respect to the connection to the individual cells of the cell module based on the measured voltages of each contact, and a charging and/or discharging unit for adjusting the cell voltage of the cell module.

9. The module charger for charging and discharging a cell module according to claim 8, wherein the electronic switching unit is formed by an optoelectronically galvanically isolated switch.

10. The module charger for charging and discharging a cell module according to claim 8, wherein the electronic switching unit is designed and/or controlled such that activation of both switches simultaneously is excluded.

* * * * *